Sept. 15, 1936.                R. F. PEO                2,054,467
                         HYDRAULIC SHOCK ABSORBER
                    Original Filed Jan. 5, 1933    2 Sheets-Sheet 1
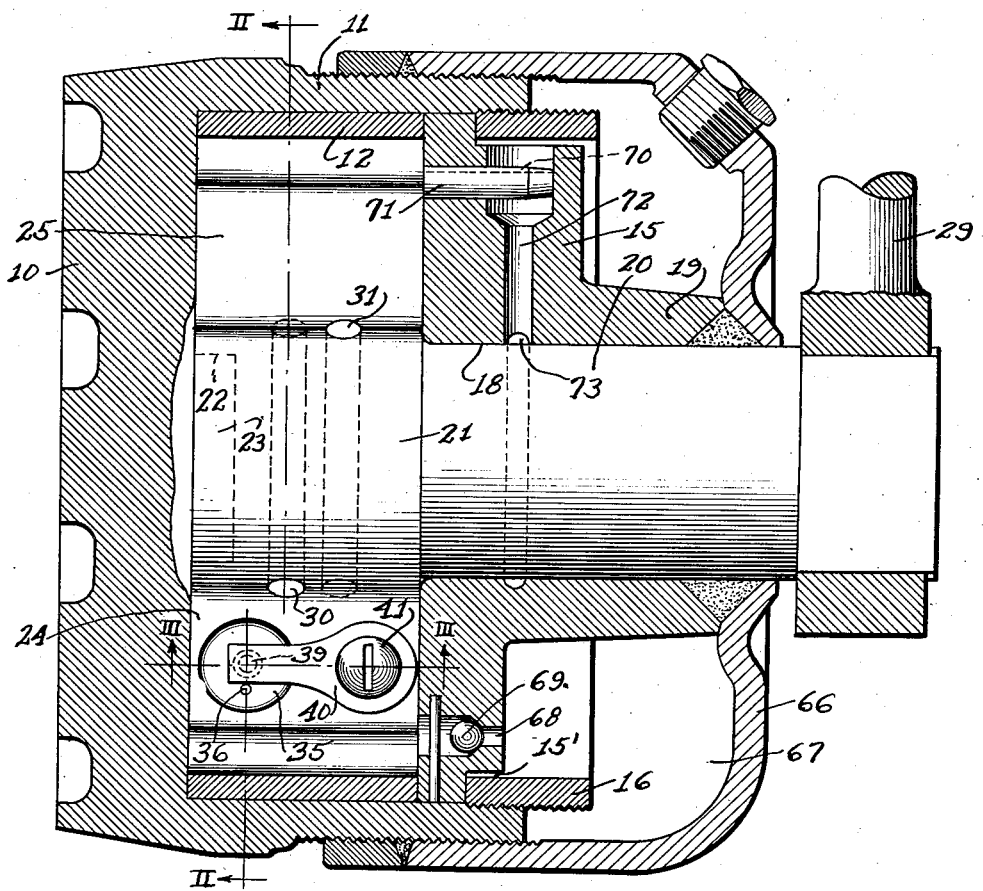
Inventor
Ralph F. Peo.
by Charles H. Hill Attys.

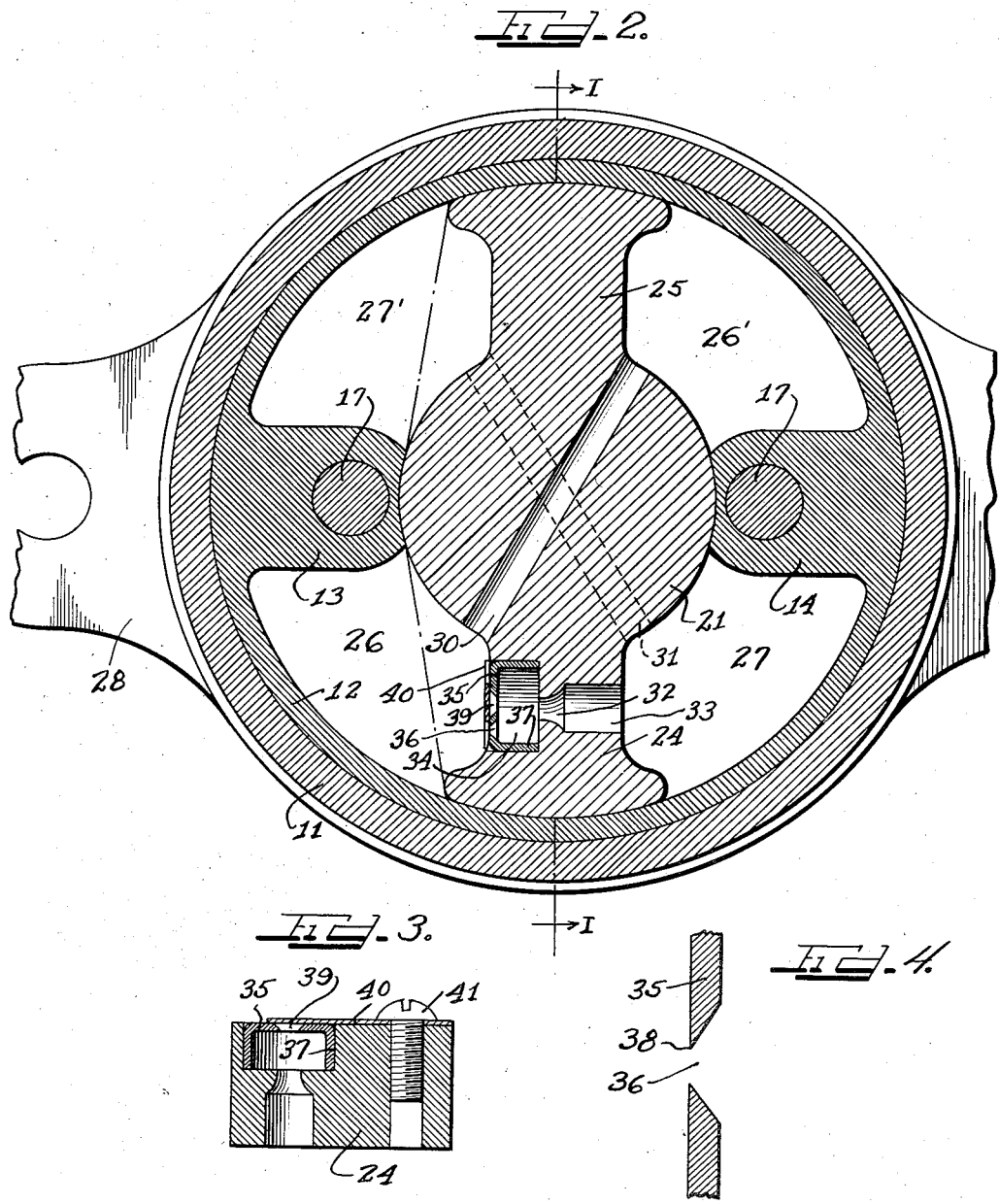

Patented Sept. 15, 1936

2,054,467

UNITED STATES PATENT OFFICE 2,054,467

HYDRAULIC SHOCK ABSORBER

Ralph F. Peo, Buffalo, N. Y., assignor to Houde Engineering Corporation, Buffalo, N. Y., a corporation of New York Original application January 5, 1933, Serial No. 650,275. Divided and this application November 16, 1935, Serial No. 50,087

5 Claims. (Cl. 188—89)

This invention relates to hydraulic shock absorbers, particularly to shock absorbers for association with the springs of automotive vehicles, and this application is a division of my copending application Serial No. 650,275, filed January 5, 1933.

In general, the object of the invention is to provide improved and simplified automatic regulation and metering of the bypassage flow of the fluid to control the shock absorber resistance accurately and efficiently without disturbance or interference by fluid temperature or viscosity variations and without the use of thermostat mechanism.

In accordance with my invention I depend upon properly designed and dimensioned orifices for metering and controlling the fluid flow independently of viscosity variations, a type of orifice which will give the desirable characteristics being the so-called sharp edge orifice.

I provide a passageway through which the hydraulic fluid is forced alternately in opposite directions during operation of the piston structure in the fluid containing casing, and in this passageway I interpose two orifices, and for one of the orifices I provide a valve, which may be in the form of a reed, for closing this orifice against flow in one direction but being yieldable for flow in the opposite direction so that for one direction of flow both orifices are available but for flow in reverse direction only one orifice is available, the valve being so arranged that the one orifice will be closed thereby by the fluid pressure during rebound movement of the vehicle springs whereby the flow during such movement will be metered by the other or permanently open orifice, both orifices being opened to the flow during the compression movement of the vehicle springs.

On the accompanying drawings I have shown my invention applied in a well-known type of shock absorber. In the drawings Figure 1 is a diametral section of a hydraulic shock absorber taken on plane 1—1 of Figure 2;

Figure 2 is a section on plane 2—2 of Figure 1;

Figure 3 is a section on plane 3—3 of Figure 1; and

Figure 4 is an enlarged section of an efficient type of viscosity compensating orifice.

The body of the shock absorber structure shown comprises the rear or base wall 10 having the peripheral cylindrical wall or flange 11 extending laterally therefrom to define a cylindrical space. Within the wall 11 and abutting thereagainst and against the base 10 is the ring 12 from which extend the diametrally opposite partition walls 13 and 14. The outer cylindrical wall or head 15 fits into the cylindrical wall 11 and abuts against the ring 12 and the partition walls 13 and 14 and has the annular recess 15' at its outer end for receiving the clamping ring 16 which has threaded engagement with the interior threads at the outer end of the wall 11, the head 15 thus being securely clamped in position. To securely hold the ring 12 and partitions 13 and 14 in place pins or keys 17 are used which extend through the partitions and into the base wall 10.

The head 15 has the bearing bore 18 which is continued through the lug or sleeve 19 extending outwardly from the head, and this bore journals the shaft 20 having at its inner end the cylindrical hub 21 which extends axially between the head 15 and the base wall 10 and has the cylindrical bearing pocket 22 for receiving the centering and bearing lug 23 extending from the base wall 10. Extending radially from opposite sides of the shaft hub are the piston members 24 and 25 whose outer ends fit against the ring 12 between the partition walls 13 and 14, the piston members extending axially between the head 15 and the base wall 10. The opposed ends of the partition walls are of cylindric surface to engage against the shaft hub with bearing fit, the piston members, the partition walls and the ring 12 dividing the interior of the shock absorber into the high pressure working chambers 26 and 26' and the low pressure chambers 27 and 27'.

The base wall 10 has ears 28 extending therefrom by means of which the shock absorber body may be secured to a support as for example the chassis of an automotive vehicle, and the shaft at its outer end has secured thereto an arm 29 whose end is adapted for connection as for example with the axle of the automotive vehicle so that as the vehicle travels and the vehicle body and axles move relatively, the shaft will oscillate the piston members against the resistance of a fluid such as oil in the working chambers.

The high pressure chambers 26 and 26' are always in communication with each other through a duct 30 extending diametrally through the hub 21 and the low pressure chambers 27 and 27' are always in communication through a duct 31 through the hub, the ends of these ducts being close to the bases of the piston or vane members 24 and 25.

As shown, one of the piston or vane members is provided with a fluid bypassageway 32 extending transversely therethrough, this bypassageway having the enlarged end 33 opening to the low pressure chamber and the enlarged end 34 forming a cylindrical pocket on the high pressure side of the vane. In the outer end of the pocket is secured a wall or disc 35 through which extends a metering orifice 36 for restricting and metering the flow of fluid from the high pressure chambers to the low pressure chambers during operation of the shock absorbers. The disc is preferably of some suitable metal and as shown is held in the pocket 34 by the annular flange 37 extending therefrom, a cup-shaped structure being thus provided through whose bottom extends the orifice 36.

The wall 35 through which the orifice extends is comparatively thin but is rigid and inflexible and the orifice shown is of the so-called standard sharp edge type shown more in detail in Figure 4 with its sharp edge 38 in the plane of the outer face of the wall 35 so that the coefficient of discharge of the fluid from the high pressure chambers to the low pressure chambers will be substantially independent of the viscosity of the fluid. In other words with this particular type of orifice or other shape orifice having the same characteristics as the type shown, the reaction or resistance to flow through the orifice measured in the pressure of the fluid under a definite displacement per unit of time will, for all practical purposes, remain unchanged during variation of the viscosity of the fluid.

The flow resistance through the orifice will increase with increase of the head or pressure which tends to force the fluid through the orifice. Such functioning of the orifice is very desirable in the operation of the shock absorber as increased opposition to fluid flow will be built up in proportion to the increasing rebound energy tending to rapidly move the piston for expulsion of the fluid through the orifice, and the shock absorber resistance will be more proportionate to the severity of road conditions.

During the high compression stroke of the piston structure occurring during rebound or movement of the chassis away from the axle, the resistance and shock absorption is controlled entirely by the flow through the restricted orifice 36. During the low compression stroke of the piston occurring when the chassis and axle approach each other the bypass restriction is considerably less. A larger orifice or port 39 communicates with the bypassageway 32 and as shown this port may be located in the wall 35 at one side of the orifice 36. A suitable valve is provided to check flow through this port during the pressure stroke of the piston structure. I have shown a reed valve 40 secured as by a screw 41 against the face of the piston vane adjacent to the bypass pocket 34 with its free end of reduced width to extend over the outer end of the port 39. During the pressure stroke this port will be closed by the valve reed and the only flow must be through the metering orifice 36. During the low compression stroke of the piston structure the fluid pressure will raise the valve so that flow may be both through the orifice and the port. The section 32 of the bypassageway is comparatively large and will offer very little resistance to the low pressure flow of fluid. The port 39 being of larger diameter than the orifice 36 will offer much less obstruction and in order that the low compression flow resistance through the port 39 may compensate for variation in viscosity of the fluid the port may be beveled away at its outer side so as to present, in offset, a sharp edge orifice to the low compression flow.

As shown on Figure 1 a casing or cap 66 is applied to the frame 11 to provide a replenishing chamber 67. Communicating with the lower ends of each of the chambers 26 and 27 in a replenishing passageway 68 controlled by a ball valve 69, the valve closing the passageway during compression of the fluid in the respective chambers. The upper end of each of the chambers 26' and 27' communicates with a restricted passageway 70 which, as shown, is in the form of a slot cut in a plug 71 extending through the head 15. At each plug a well structure 72 is provided whose walls form part of the head 15, the upper ends of the wells being shown above the passageway 70 and the bottoms of the wells communicating with an annular channel 73 formed in the bearing 19. Any fluid which may leak out between the piston hub and its shaft and the bearing 19 will be collected by the channel and will rise in the wells and keep the respective relief channels 70 covered and sealed against the return of air to the working chambers at the top thereof.

I have shown a practical and efficient embodiment of the various features of my invention but I do not desire to be limited to the exact construction and arrangement shown and described as changes and modifications may be made without departing from the scope of the invention as defined in the appended claims.

I claim as my invention:

1. In a hydraulic shock absorber, a housing enclosing a high pressure chamber and a low pressure chamber, a piston operable to displace fluid in said chambers, a passage between said chambers for flow of the displaced fluid, means providing an orifice permanently open for a restricted but unobstructed flow of liquid between said chambers at a rate substantially independent of viscosity changes in the liquid and a second orifice in said passage for additional flow therethrough, and means controlled by the pressure of the fluid for closing said second orifice against flow from the high pressure chamber to the low pressure chamber.

2. In a hydraulic shock absorber, a housing enclosing a high pressure chamber and a low pressure chamber, a piston operable to displace fluid in said chambers, a passage between said chambers for the flow of the displaced fluid, means providing two orifices for said passage for a restricted flow of fluid between said chambers at a rate substantially independent of viscosity changes in the fluid, one of said orifices being permanently open for unobstructed flow therethrough and means controlled by the pressure of the fluid for closing the other orifice against flow from the high pressure chamber to the low pressure chamber.

3. In a hydraulic shock absorber, a fluid chamber, a member movable in said chamber to displace fluid therein, a by-pass for flow of fluid from one side of said member to the other during movement of said member, a rigid disc interposed in said by-pass and having an orifice and a port therethrough, said orifice being permanently open for unobstructed flow therethrough and being of the sharp edged type thru which the rate of flow is practically independent of viscosity changes in the liquid flowing therethrough, a check valve movable by the pressure of the fluid to close said port whereby all the fluid flow in one direction through said by-pass must be through said orifice, said check valve yielding to the pressure in the opposite direction for flow of the fluid through both said port and said orifice.

4. In a hydraulic shock absorber, a chamber for confining fluid, a member movable in said chamber to displace the fluid therein, a by-pass for flow of fluid from one side of the movable member to the other, a wall interposed in said by-pass having two orifices therethrough one of which is restricted more than the other but being permanently open for unobstructed flow therethrough, a valve for closing the less restricted orifice against flow when said member moves in one direction and for opening said orifice when the member moves in the opposite direction, each of said orifices being of a type through which the rate of flow is substantially independent of viscosity changes in the liquid flowing therethrough.

5. In a hydraulic shock absorber, a housing enclosing a high pressure chamber and a low pressure chamber, a piston operable to displace fluid in said chambers, a passage between said chambers for flow of the displaced fluid, a restricted orifice in said passage for flow of fluid between said chambers at a rate substantially independent of viscosity changes in the fluid, and a second orifice in said passage for additional flow therethrough, and a member having a flap portion cooperating with said second orifice and controlled by the pressure of the fluid for closing said second orifice against flow from the high pressure to the low pressure chamber.

RALPH F. PEO.